June 26, 1923.
H. D. SHELTON
WIND WHEEL
Filed Feb. 23, 1922
1,460,114
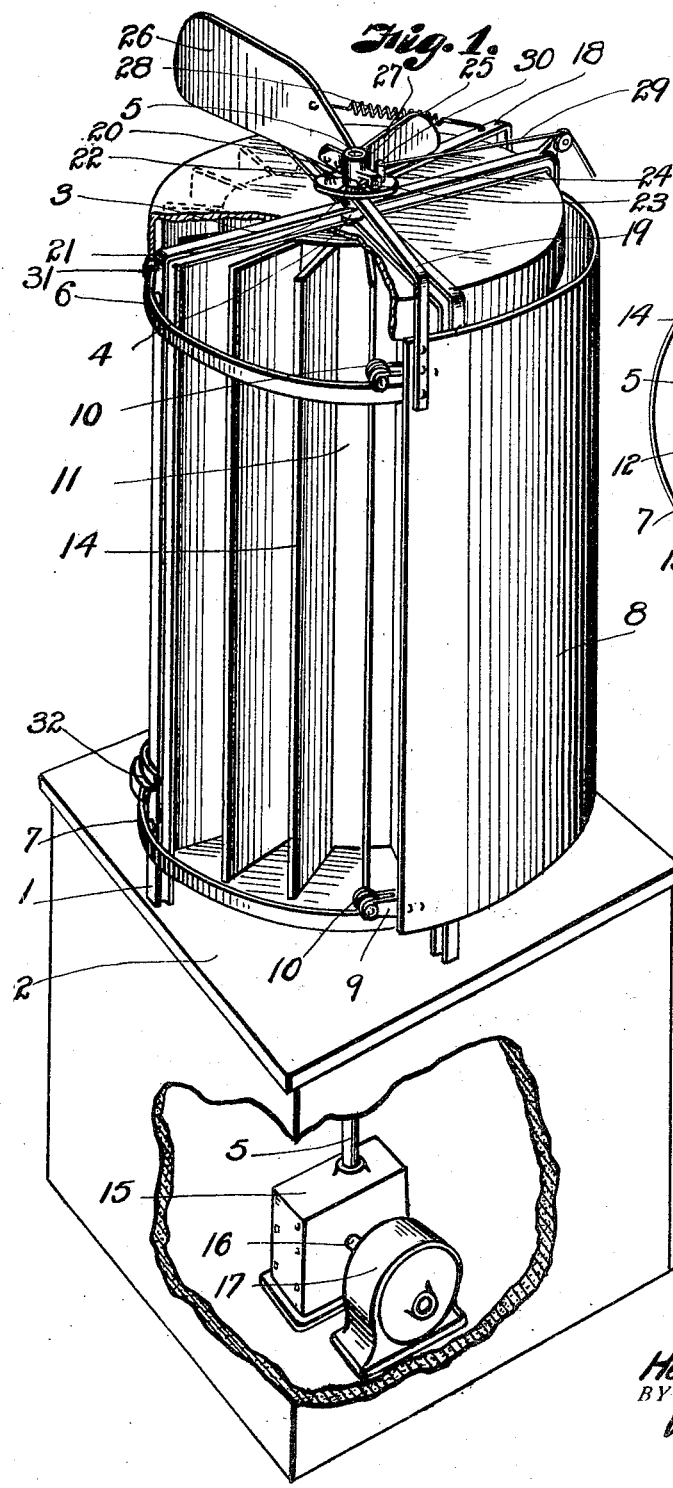
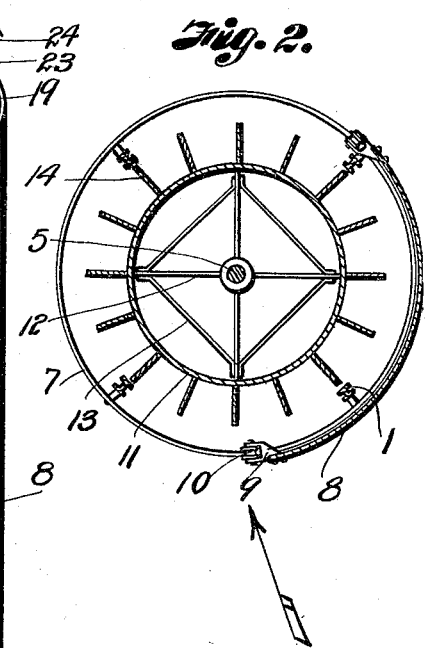
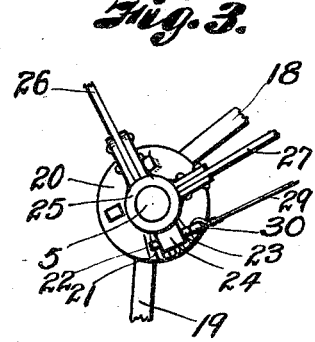
INVENTOR
Henry D. Shelton.
BY Arthur C. Brown
ATTORNEY Patented June 26, 1923.

1,460,114

UNITED STATES PATENT OFFICE.

HENRY D. SHELTON, OF HUGHESVILLE, MISSOURI.

WIND WHEEL.

Application filed February 23, 1922. Serial No. 538,540.

*To all whom it may concern:*

Be it known that I, HENRY D. SHELTON, a citizen of the United States, residing at Hughesville, in the county of Pettis and State of Missouri, have invented certain new and useful Improvements in Wind Wheels; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to wind wheels and particularly to a wheel in which means is provided for shielding the blades from the action of the wind when the velocity of the wind is such as to tend to wreck or injure the wind wheel mechanism.

Means is also provided whereby the shield can be restored to non-shielding position.

The novel details of construction of the invention as well as the method of operation will be apparent by reference to the following description in connection with the accompanying drawings, in which—

Fig. 1 is a perspective view of a wind wheel constructed in accordance with my invention, part of the motor housing being broken away to show the construction of the motor.

Fig. 2 is a horizontal, sectional view through the wind wheel, and

Fig. 3 is a detail plan view of the shield hub and parts of the vanes, as well as the dog for ratcheting the hub about its axis.

The frame consists of a plurality of standards 1, mounted on the base 2 and having their upper ends bent to provide horizontal radial brace portions 3, which are connected to a bearing collar 4, through which the upper end of the shaft 5 projects.

The standards are connected by circular tracks 6 and 7, which support the shield 8, having brackets 9 at its respective corners with idlers or rollers 10 which ride on the tracks, as clearly seen in Figs. 1 and 2.

The wind wheel consists of a drum 11, fastened to the shaft 5 by the diagonal braces 12 and 13, the braces 12 being fastened both to the braces 13 and to the shaft. Therefore, if the drum 11 rotates, the shaft 5 must rotate.

In order to rotate the drum by the force of the wind, a plurality of externally positioned, elongated, outstanding, radial blades 14 are provided, the inner edges of which are secured to the drum and receive the impact of the wind so that the drum will be rotated when the wind is strong enough to turn it.

The lower end of the shaft 5 is received in a gear box 15 and through the gears in the box 15 the shaft 16 of the generator 17 is driven. It is obvious, however, that any driven element may be substituted for the generator 17 and that the generator and gear box may be dispensed with and the driven element driven directly from the shaft 5.

Attention is directed to the fact that the circular tracks 6 and 7 are spaced from the standards or I-beam 1 so that the grooved rollers 10 may pass along the tracks 6 when the screen or shield 8 is moved about the axis of the wheel.

Secured to the upper edge of the shield 8 are inwardly directed braces or bracket rods 18 and 19, which are secured to the plate or hub member 20 (see Figs. 1 and 3). The upper face of the hub plate 20, which is loosely mounted on the shaft 5, is provided with rack or ratchet projections 21 to be engaged by the toe 22 of a pivoted ratcheting dog or pawl 23, pivotally carried by the arm 24 on the hub or sleeve 25 loosely mounted on the shaft 5. The sleeve 25 carries outwardly directed vanes or wings 26 and 27, the former of which is considerably larger than the other. The vane 26 is engaged by one end of a tension spring 28, the other end of the tension spring being secured to the bracket 18 so that there will be a normal tendency to cause the vane 26 to move in a clockwise direction.

If the parts are assembled, however, as shown in Fig. 1, and the wind is acting on the exposed blades, the vane 26 will be parallel with the stream lines of the wind while the smaller vane 27, which is about 90° distant from the vane 26, will be at substantially right angles to the stream lines where it will receive the full force thereof. Therefore, when the wind reaches a velocity to create sufficient pressure against the vane 27, it will swing it around from right to left and since both vanes are fast to the sleeve 25 which carries the ratchet or dog 23, the sleeve 25 will be rotated, causing the toe 22 of the dog to ride over the ratchet teeth 21 until the vane 26 intersects the stream lines of air. In doing this, of course, it will expand the tension spring 28.

When the wind strikes the vane 26 at an angle, it will throw it around from left to right and since the dog will engage the ratchet teeth 21, the plate 20 will be rotated, the spring assisting in doing this in its attempt to reach its equilibrium.

In view of the fact that the screen or shield 8 is fastened to the plate 20 through the brackets 18 and 19, the rotation of the member 20 will cause the shield to move from right to left and partially shield the blades from contact with the wind. As soon as the wing or vane 26 has been restored back to position where it is parallel with the stream lines of the wind, the little vane 27 will again be in position to feel the force of the wind so that it will throw the vane 26 at an angle to the stream lines of the wind so that it can be again shifted around to move the shield a further proportion of its movement until the blades are entirely shielded.

When it is desired to release the pawl or dog from engagement with the ratchet teeth, this can be accomplished from the ground by means of a flexible connection, cord or cable 29, which is fastened to the upstanding arm 30 of the dog.

In order to protect the rollers 10 and the tracks 6 and 7 from the elements I provide overhanging shields 31 and 32.

What I claim and desire to secure by Letters-Patent is:

1. A wind wheel comprising a drum having vertical blades, a shaft to which the wind wheel is fastened, a shield pivoted about the axis of the shaft and having a wall part adapted to move about the periphery of the wheel, the shield having a part provided with ratchet teeth, a freely movable vane swinging about an axis in line with the axis of the shaft, and a pawl movable in response to the swinging movement of the vane to ride over the ratchet teeth when the vane moves in one direction and to engage the ratchet teeth when the vane moves in the opposite direction so that when the vane moves in one direction the shield will be shifted with respect to the wheel blades.

2. A wind wheel comprising a plurality of vertical blades, a shaft, means for connecting the blades to the shaft, a shield located about the periphery of the wheel and swinging about an axis concentric with the axis of the shaft, horizontal vanes connected together and at angles one to the other, one of the vanes being smaller than the other, and means carried by the vanes for imparting a step by step movement to the shield to cause it to assume a position with respect to the blades to shield them from contact with the wind.

3. A wind wheel, a shield movable about the periphery of the wind wheel, vanes movable in opposite directions in an arc, and means carried by the vanes for imparting movement to the shield when the vanes move in one direction only, the vanes being free to move in the opposite direction independently of the shield.

4. A wind wheel, a shield movable about the periphery of the blades of the wind wheel, a pair of vanes connected together, a pivot support for said vanes, a pawl carried by said vanes, and a device rigid with the shield and having ratchet teeth for engagement with said dog when the vanes move in one direction, the dog being free to ride over the ratchet teeth when the vanes move in an opposite direction.

5. A wind wheel, a shield movable about the periphery of the wind wheel, a pair of vanes movable about a pivot concentric with the axis of the wind wheel, one of the vanes being smaller than the other, the vanes being disposed at substantially right angles one to the other, a plurality of ratchet teeth carried by the shield, and a pawl operated by the vanes to turn the shield when the vanes move in one direction and to release the shield when the vanes move in an opposite direction.

In testimony whereof I affix my signature.

HENRY D. SHELTON.